(12) United States Patent
Yamamoto

(10) Patent No.: US 9,176,634 B2
(45) Date of Patent: Nov. 3, 2015

(54) OPERATION DEVICE

(75) Inventor: Takuo Yamamoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/365,319

(22) PCT Filed: Dec. 15, 2011

(86) PCT No.: PCT/JP2011/079087
§ 371 (c)(1),
(2), (4) Date: Jun. 13, 2014

(87) PCT Pub. No.: WO2013/088559
PCT Pub. Date: Jun. 20, 2013

(65) Prior Publication Data
US 2015/0009177 A1 Jan. 8, 2015

(51) Int. Cl.
*G06F 3/041* (2006.01)
*G06F 3/044* (2006.01)
*G06F 3/0488* (2013.01)
*G06F 3/0354* (2013.01)

(52) U.S. Cl.
CPC ............ *G06F 3/044* (2013.01); *G06F 3/03547* (2013.01); *G06F 3/0414* (2013.01); *G06F 3/04883* (2013.01); *G06F 3/04886* (2013.01)

(58) Field of Classification Search
None
See application file for complete search history.

(56) References Cited

U.S. PATENT DOCUMENTS

| 6,029,214 A | 2/2000 | Dorfman et al. |
| 2010/0177042 A1 | 7/2010 | Chen |
| 2010/0328236 A1 | 12/2010 | Ma |
| 2011/0199299 A1* | 8/2011 | Miyashita ............... 345/157 |
| 2011/0265021 A1* | 10/2011 | Chien et al. ............... 715/769 |
| 2012/0113001 A1 | 5/2012 | Yamauchi et al. |

FOREIGN PATENT DOCUMENTS

| JP | 09-319508 A | 12/1997 |
| JP | 2986234 B2 | 10/1999 |
| JP | 2001-117713 A | 4/2001 |

(Continued)

OTHER PUBLICATIONS

Partial translation of third Written Opinion of the International Preliminary Examining Authority (PCT Rule 66), Form PCT/IPEA/408) for PCT/JP2011/079087 mailed Dec. 25, 2012.

(Continued)

*Primary Examiner* — Adam R Giesy
(74) *Attorney, Agent, or Firm* — Sughrue Mion, PLLC

(57) ABSTRACT

An operation device includes a touch operation unit that has an operation surface; and a control device that responds to a selection operation performed on each of selection items displayed on a display device arranged remotely from the touch operation unit, based on two-dimensional coordinates of a finger touch point on the operation surface, wherein the control device operates in an absolute coordinate mode, in which a coordinate system of the display device corresponds absolutely to a coordinate system of the operation surface of the touch operation unit, when any of the selection items is not selected and, at the same time, operates in a relative coordinate mode, in which the coordinate system of the display device corresponds relatively to the coordinate system of the operation surface of the touch operation unit, when one of the selection items is selected.

10 Claims, 12 Drawing Sheets

(56) References Cited

FOREIGN PATENT DOCUMENTS

| | | |
|---|---|---|
| JP | 2011-159166 A | 8/2011 |
| WO | 2011/145330 A1 | 11/2011 |

OTHER PUBLICATIONS http://www.youtube.com/watch?v-oZ759fGrkqk.
International Search Report for PCT/JP2011/079087 mailed Jan. 17, 2012.

* cited by examiner

FIG. 6
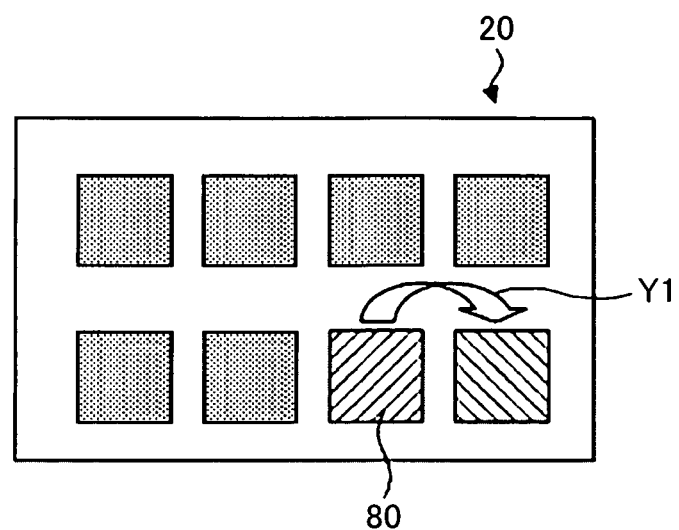
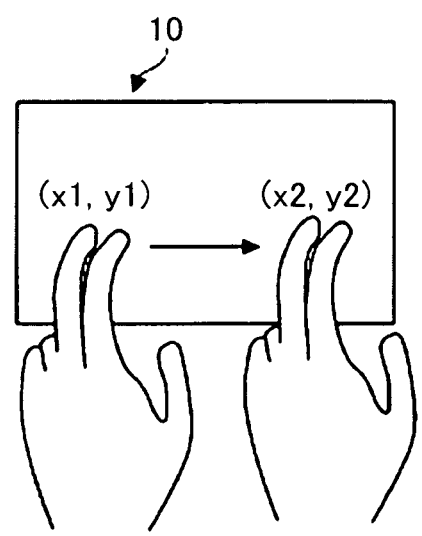

FIG. 7
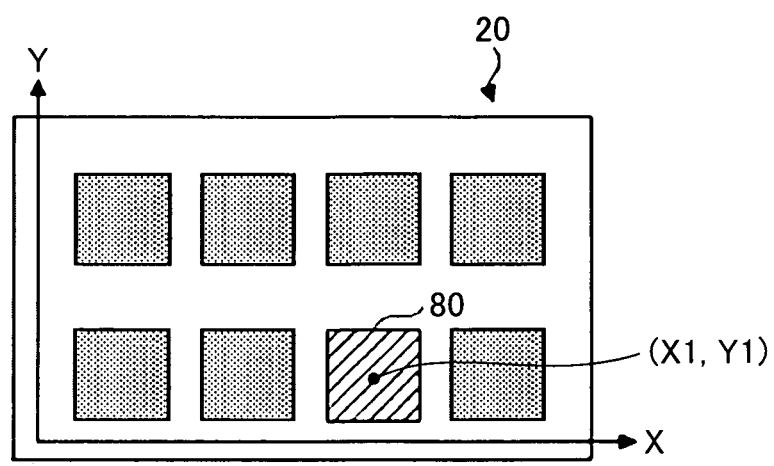
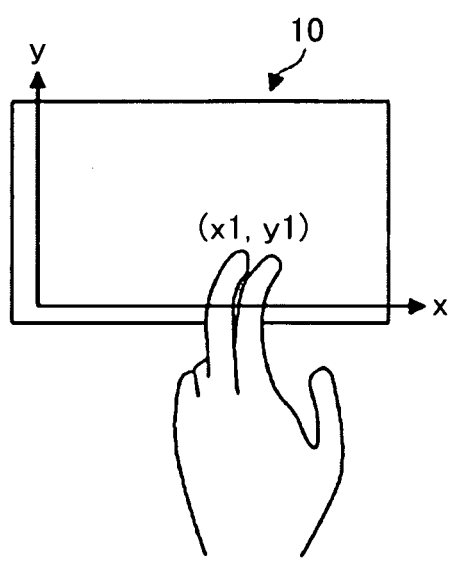

F I G . 10
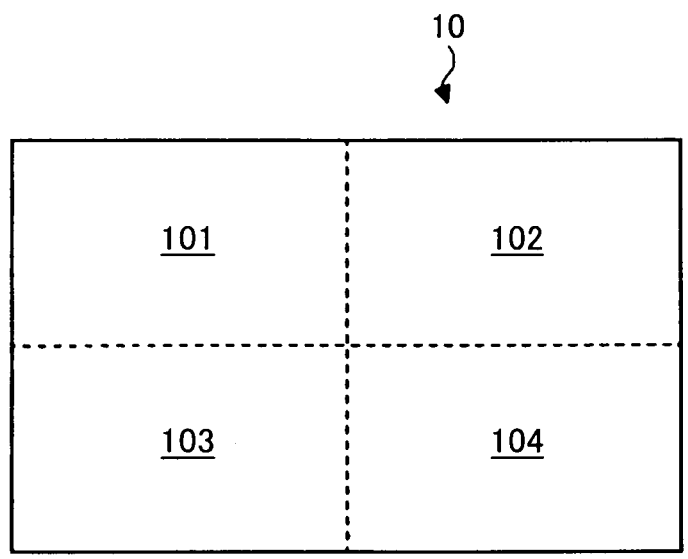

FIG. 11
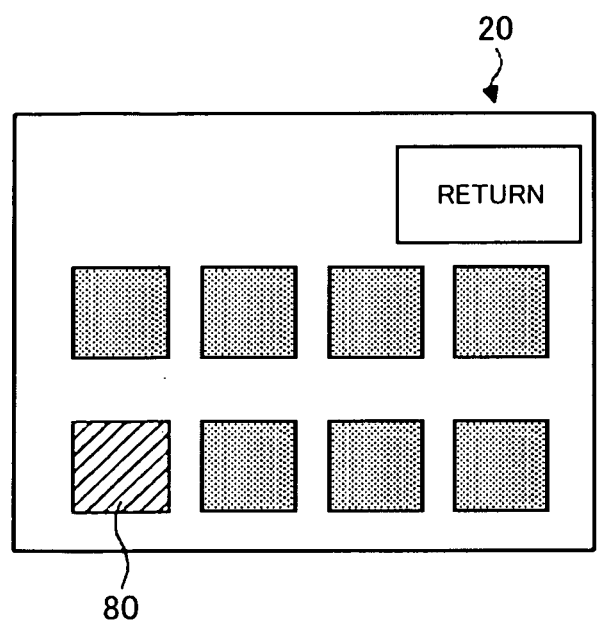
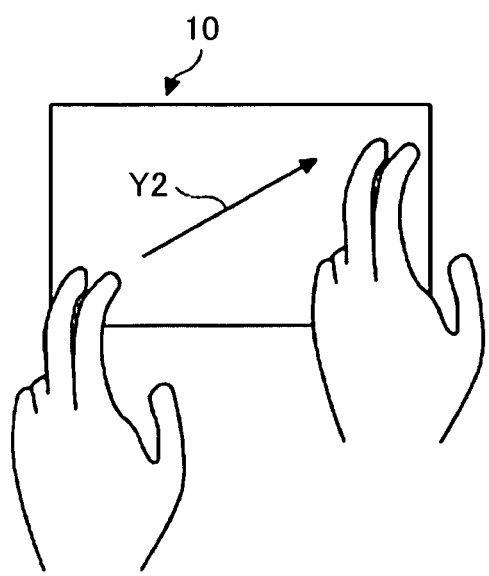

F I G . 14
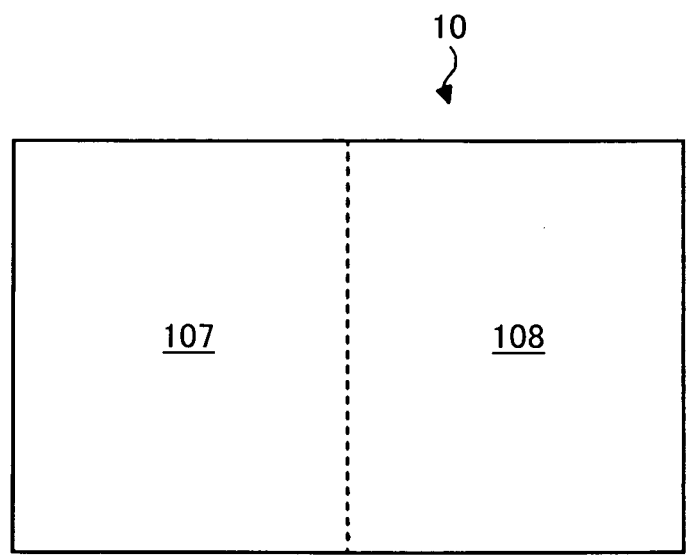

OPERATION DEVICE

TECHNICAL FIELD

The present invention relates to an operation device having a touch operation unit.

BACKGROUND ART

Conventionally, a technology that allows switching between the relative coordinate mode and the absolute coordinate mode is known as a touch pad coordinate mode to enable a handwritten character to be entered (for example, see Patent Literature 1).

CITATION LIST

Patent Literature

Patent Literature 1: Japanese Patent Application Publication No. 09-319508 (JP 09-319508 A)

SUMMARY OF THE INVENTION

Technical Problem

However, the configuration described in Patent Literature 1 requires the user to manually switch the coordinate mode and, therefore, there is room for improvement in terms of convenience.

To solve this problem, it is an object of the present invention to provide an operation device capable of switching between the relative coordinate mode and the absolute coordinate mode in a highly convenient mode.

Solution to Problem

According to one aspect of the present invention, an operation device is provided that includes:

a touch operation unit that has an operation surface; and a control device that responds to a selection operation performed on each of selection items displayed on a display device arranged remotely from the touch operation unit, based on two-dimensional coordinates of a finger touch point on the operation surface wherein the control device operates in an absolute coordinate mode when any of the selection items is not selected and, at the same time, operates in a relative coordinate mode when one of the selection items is selected, the absolute coordinate mode being a mode in which a coordinate system of the operation surface of the touch operation unit corresponds absolutely to a coordinate system of the display device, the relative coordinate mode being a mode in which the coordinate system of the operation surface of the touch operation unit corresponds relatively to the coordinate system of the display device.

Advantageous Effects of Invention

The present invention provides an operation device capable of switching between the relative coordinate mode and the absolute coordinate mode in a highly convenient mode.

BRIEF DESCRIPTION OF THE DRAWINGS

FIG. 6 is a diagram schematically showing the display 20 and the touch pad 10 and conceptually showing an example of an operation in the relative coordinate mode.

FIG. 7 is a diagram schematically showing the display 20 and the touch pad 10 and conceptually showing an example of an operation in the absolute coordinate mode.

FIG. 10 is a diagram showing an example of the setting method of areas related to step 903B in FIG. 9.

FIG. 11 is a diagram schematically showing the display 20 and the touch pad 10 and showing a drawback of the relative coordinate mode that may be generated when the user wants to select the selection item "Return".

FIG. 14 is a general diagram of the touch pad 10 showing the setting method of areas related to FIG. 13.

MODES FOR CARRYING OUT THE INVENTION

The best mode for carrying out the present invention is described below with reference to the drawings.

Figure 1:
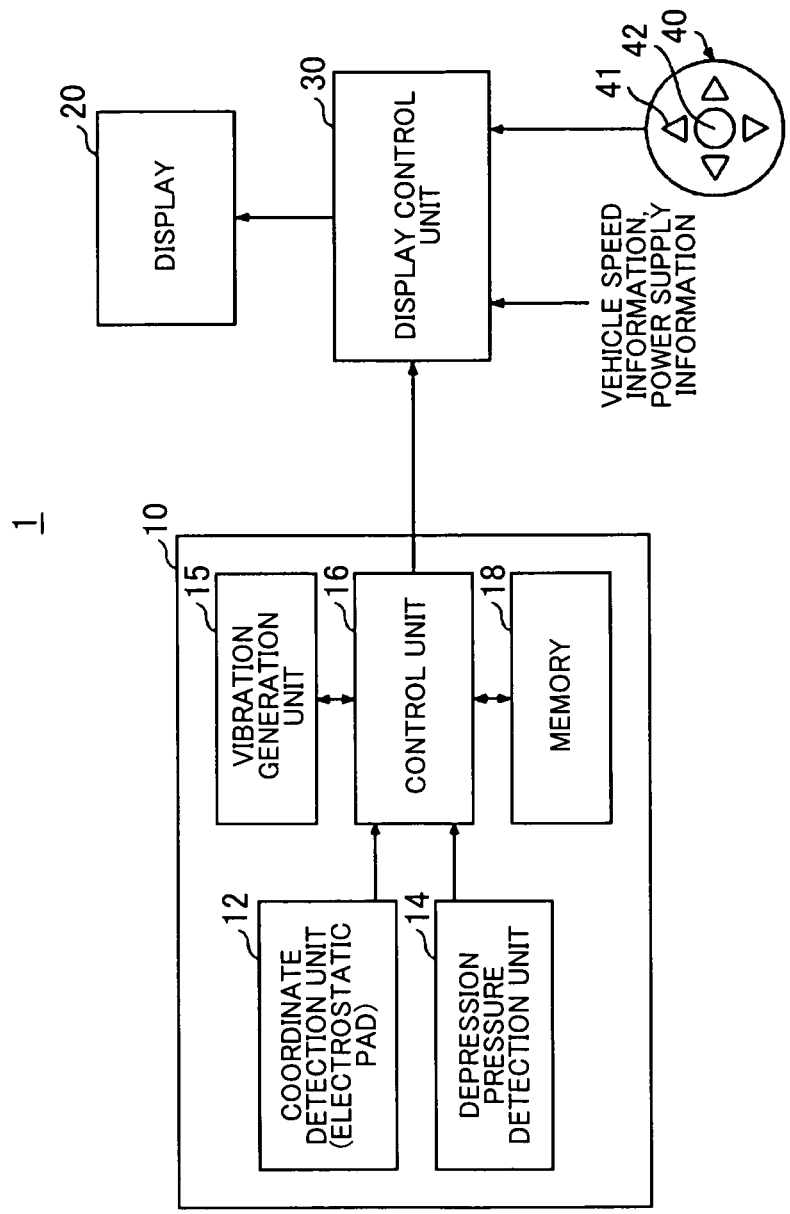
FIG. 1 is a system diagram showing a main part configuration of an on-vehicle operation device 1 in one embodiment of the present invention.
Figure 2:
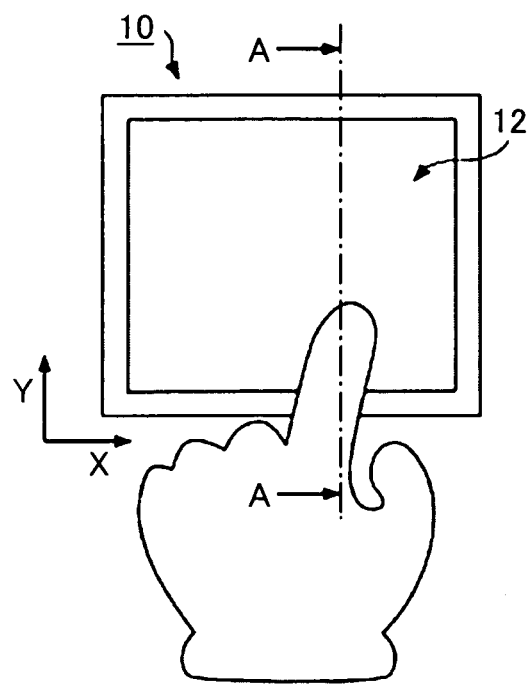
FIG. 2 is a top view schematically showing a touch pad 10.
Figure 3:
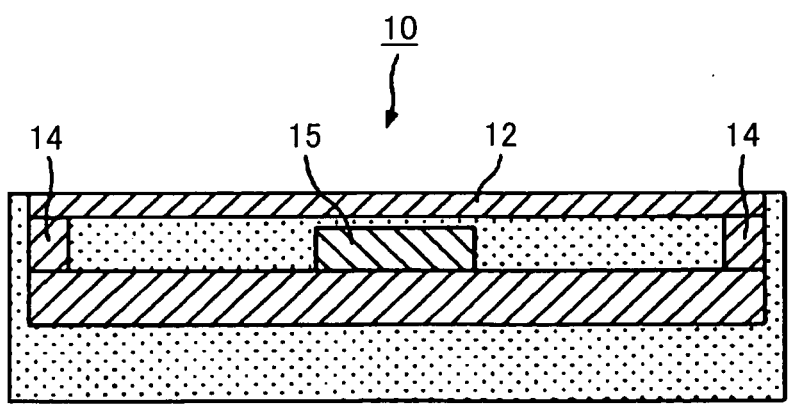
FIG. 3 is a cross sectional diagram schematically showing the main part cross section of the touch pad 10.
Figure 4:
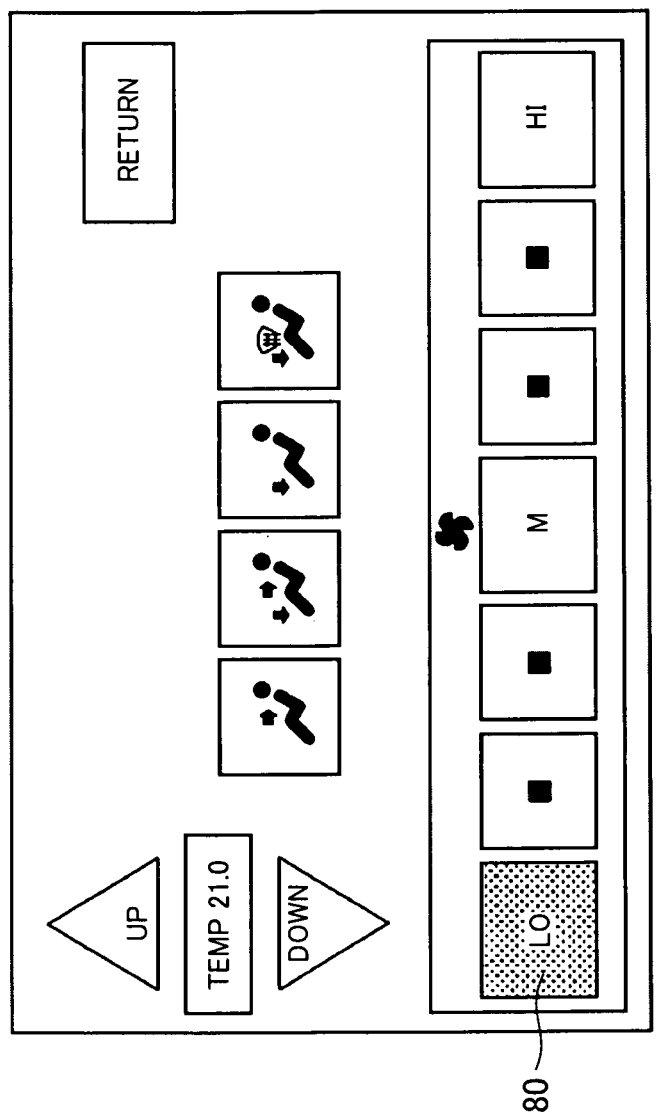
FIG. 4 is a diagram showing one example of an operation screen displayed on a display 20.

FIG. 1 is a system diagram showing a main part configuration of an on-vehicle operation device 1 in one embodiment of the present invention. FIG. 2 is a top view schematically showing a touch pad 10. FIG. 3 is a cross sectional diagram schematically showing the main part cross section of the touch pad 10. A hand, with which the user operates the touch pad 10, is schematically shown in FIG. 2 but not in FIG. 3. FIG. 4 is a diagram showing one example of an operation screen displayed on a display 20.

The on-vehicle operation device 1 includes the touch pad 10, the display 20, and a display control unit 30.

The touch pad 10 is provided in a suitable place in the vehicle interior. The touch pad 10 is arranged preferably in a position the driver finds it easy to operate (position reachable by the driver while driving). The touch pad 10 may be arranged, for example, in the console box or the surrounding thereof. As shown in FIG. 1, the touch pad 10 includes a coordinate detection unit 12, a depression pressure detection unit 14, a vibration generation unit 15, a control unit 16, and a memory 18.

As shown in FIG. 2, the coordinate detection unit 12 has an approximately flat two-dimensional operation surface (touch operation surface). The coordinate detection unit 12 has an electrostatic sensor the detection signal of which is sent to the control unit 16. The coordinate detection unit 12 is configured, for example, by an electrostatic pad. The electrostatic pad has a structure in which the electrodes (electrostatic sensors) are linearly arranged in the X direction and the Y direction respectively in the plane with insulators between them. When a human brings his or her finger close to an electrode with the finger and an insulator panel between them, a capacitor is formed with the electrode and the finger as the polar plates, and the electric charge amount (and its electrostatic capacity) of the electrode changes. In this case, the detection signal of the electrode (signal indicating the amount of change in electric charge stored in the electrode) may be sent to the control unit 16.

The depression pressure detection unit 14 detects a pressure or a load applied to the touch pad 10 (typically, the electrostatic pad of the coordinate detection unit 12). That is, the depression pressure detection unit 14 detects a depression operation (confirmation operation) on the touch pad 10. The depression pressure detection unit 14 is configured, for example, by a pressure sensitive sensor (for example, pressure-sensitive device). The depression pressure detection unit 14 may be arranged in any position where a load in the direction of depression, applied to the operation surface of the coordinate detection unit 12, is transmitted. For example, the pressure-sensitive sensors configuring the depression pressure detection unit 14, though provided in such a way that they support the periphery of the coordinate detection unit 12 in the example shown in FIG. 3, may be installed below the center of the coordinate detection unit 12. In addition, the pressure-sensitive sensors configuring the depression pressure detection unit 14 may be provided in a plurality of dispersed positions.

The vibration generation unit 15 is configured by an actuator that generates vibrations. The vibration generation unit 15 may be arranged in any position where generated vibrations are transmitted to the operation surface of the coordinate detection unit 12. For example, the vibration generation unit 15, though provided below the center of the coordinate detection unit 12 in the example shown in FIG. 3, may be installed below the periphery of the coordinate detection unit 12. In addition, the vibration generation unit 15 may be provided in a plurality of dispersed positions below the coordinate detection unit 12.

The control unit 16 and the memory 18 are configured, for example, by microcomputers.

The control unit 16 generates a coordinate signal that indicates a coordinate position on the operation surface, that is, a coordinate signal that indicates a coordinate position touched by the operator (position of an operation finger), based on the output (detection signal) received from the coordinate detection unit 12. When the coordinate detection unit 12 is configured by an electrostatic pad, electric charge is stored in the capacitor, formed by the electrode and the operation finger as described above, and the amount of change in electric charge at each electrode varies according to the position of the operation finger. Therefore, based on the detection signal received from the electrodes, the position of the operation finger can be identified. More specifically, when the output from the coordinate detection unit 12 exceeds a predetermined reference value, the control unit 16 generates a coordinate signal based on a position corresponding to the maximum output from the coordinate detection unit 12. The predetermined reference value is a value related to the amount of change in electric charge stored in an electrode. For example, when the amount of change in electric charge stored in an electrode (maximum amount of change in electric charge) exceeds the reference value, the control unit 16 generates a coordinate signal (for example, a coordinate signal indicating a two-dimensional position corresponding to the maximum amount of change in electric charge) under a determination that the operator has performed the selection operation. On the other hand, when the amount of change in electric charge stored in an electrode does not exceed the reference value, the control unit 16 does not generate a coordinate signal under a determination that the operator has not yet performed the selection operation. The reference value may be stored in the memory 18. The generated coordinate signal is sent to the display control unit 30.

The control unit 16 generates a confirmation signal based on the output (detection signal indicating a pressure or a load) received from the depression pressure detection unit 14. For example, when the output (depression pressure) received from the depression pressure detection unit 14 exceeds a predetermined threshold Pn, the control unit 16 detects a confirmation operation performed by the operator and generates a confirmation signal. The generated confirmation signal is sent to the display control unit 30. When there is a plurality of pressure sensitive sensors that configure the depression pressure detection unit 14, the control unit 16 may generate a confirmation signal when the output from any one of the pressure sensitive sensors exceeds the predetermined threshold Pn. In this case, the plurality of pressure sensitive sensors may be provided, not to detect a depression position on the touch pad 10 (typically, electrostatic pad configuring the coordinate detection unit 12), but to detect only whether or not a depression operation is performed on the touch pad 10. Therefore, the confirmation signal may be a signal that indicates only the detection of a confirmation operation but does not include other information such as that on a position where the depression operation is performed.

When a confirmation operation is detected, the control unit 16 causes the vibration generation unit 15 to generate a vibration on the operation surface of the coordinate detection unit 12. This vibration allows the operator to feel with his or her finger that the confirmation operation has been performed. In addition, when a selection operation is performed to change a selection item, the control unit 16 causes the vibration generation unit 15 to generate a vibration on the operation surface of the coordinate detection unit 12. This vibration allows the operator to feel with his or her finger that the selection item has been changed by the selection operation. These vibrations are generated only to perform the feedback function for the operator (the function to give the operator a pseudo click feeling) and, therefore, the vibrations may be generated for a very short time (momentarily as when performing a click operation).

The control unit 16 carries out communication with the display control unit 30 to send various types of information (coordinate signal, confirmation signal, message output request, and so on) to the display control unit 30. The function of the control unit 16 may be performed, in part or in whole, by the coordinate detection unit 12.

The display 20 may be any type of display device such as a liquid crystal display or an HUD (head-up display). The display 20 is arranged in a suitable position in the vehicle interior (for example, on the instrument panel). The display 20 may be a touch panel display or may be a display on which the touch operation cannot be performed. On the display 20, an operation screen (see FIG. 4) indicating the operation contents, which can be performed on the touch pad 10, is displayed. A video from a TV or a periphery-monitoring camera may be displayed on the display 20 as the background of the operation screen or may be displayed when the operation screen is not displayed.

The operation screen may be displayed in the whole screen as shown in FIG. 4 or in a part of the screen. The operation screen may include two or more selection items, for which operation can be performed on the touch pad 10, as shown in FIG. 4. The operation screen may include other information display parts (for example, a part where TV, audio, outdoor temperature, traveling information such as fuel consumption, or entertainment information is displayed). In the example shown in FIG. 4, the operation screen is the one for specifying the setting of an air conditioner using the touch pad 10.

A selection item is displayed as a virtual operation button (meaning that the button is not a mechanical button that can be operated directly by a hand). A selection item (operation button) may relate to any type (function). That is, the contents that can be operated on the touch pad 10 may be any operation. For example, selection items may include a selection item that displays (calls) on the display 20 a screen (operation screen) for specifying various settings for a navigation device or a map screen (for example, the current position display screen). Selection items may also include a selection item for specifying various settings for an air conditioner or a selection item for displaying the screen on the display 20. In addition, selection items may include a selection item for specifying various settings (volume control, etc.,) for an audio or a TV or a selection item for displaying the screen on the display 20. A selection item may be a selection item (icon, launcher) for starting an application. A selection item may be a character entry button on the operation screen such as that on the Japanese syllabary entry screen. In addition, a selection item may be a whole area (a set of selectable points), such as a map area on a map screen, in which a position can be specified by a pointer.

A selection item is changed from the normal display to the selection display, or from the selection display to the normal display, based on the coordinate signal received from the touch pad 10 under control of the display control unit 30 that will be described later. In the example shown in FIG. 4, a cursor 80, which can be moved by an operation on the touch pad 10, is shown on the display 20. The cursor 80 now selects the blower air volume "LO" and, therefore, the selection item "LO" is selectively displayed. In the description below, the cursor 80 represents a selection item itself that is selectively displayed. Therefore, the position of the cursor 80 corresponds to the position of a selectively displayed selection item.

The display control unit 30 is configured, for example, by a microcomputer and may be embodied as an ECU. The display control unit 30 and the touch pad 10 may be connected in any connection mode—cable connection, wireless connection, or their combination—and the connection may be direct or indirect. The function of the display control unit 30 may be performed, in part or in whole, by the control unit 16 of the touch pad 10 or by the control unit (not shown) in the display 20. Conversely, the function of the control unit 16 of the touch pad 10 may be performed, in part or in whole, by the display control unit 30.

The vehicle speed information indicating the vehicle speed and the power supply information about the power supply state of the vehicle (IG, ACC) may be input to the display control unit 30 as necessary.

A mechanical switch 40 is connected to the display control unit 30 as an optional configuration. The mechanical switch 40 includes selection switches 41 and a confirmation switch 42. In the example shown in the figure, the selection switches 41 include the switches indicating up, down, right, and left. The mechanical switch 40 may be steering switches provided on the steering wheel.

The main function of the display control unit 30 is to synchronize the display 20 with the touch pad 10 to help the operator to perform an operation on the touch pad 10. More specifically, the display control unit 30 displays an operation screen (see FIG. 4) on the display 20 and, at the same time, performs the selection/confirmation processing on various types of selection items based on signals (coordinate signal and determination signal) received from the touch pad 10.

That is, as described above, the display control unit 30 selectively displays one of the selection items, which are displayed on the operation screen, based on the coordinate signal received from the touch pad 10 (that is, responds to the "selection operation"). In other words, the display control unit 30 determines the position of the cursor 80. The detail of the method for determining the position of the cursor 80 based on the coordinate signal will be described later. In the initial state, one of the selection items may be selectively displayed as the default or all selection items may be non-selectively displayed. A selective display (that is, the mode of the cursor 80) may be implemented in any manner as long as the operator can understand that the selection item is selected. For example, the display brightness or the color of a selection item to be selectively displayed may be made different from that of other selection items or the frame of a selection item may be highlighted. Based on the confirmation signal received from the touch pad 10, the display control unit 30 performs the operation contents of a selection item selectively displayed at that time (that is, responds to the "confirmation operation"). The operation contents, which depend on a selection item, may involve screen transitions such as the display of lower-level selection items or a change from one operation screen to another, the entry of characters, the startup of an application, and the transmission of control signals to an operation target device (for example, air conditioner). When a confirmation operation is detected, it is possible to change the display of the confirmed selection item as needed or to generate a predetermined sound to enable the operator to know that the "confirmation operation" is detected.

According to the touch pad 10 in this embodiment, the operator moves the operation finger (for example, index finger) across the operation surface while viewing the display 20, with the operation finger on the operation surface of the coordinate detection unit 12, to perform the selection operation for selecting a desired selection item. When the desired selection item becomes selectively displayed, the operator can depress the coordinate detection unit 12 at that position to perform the confirmation operation. That is, the confirmation operation can be performed by depressing the coordinate detection unit 12 at the touch position where the desired selection is made.

Figure 5:
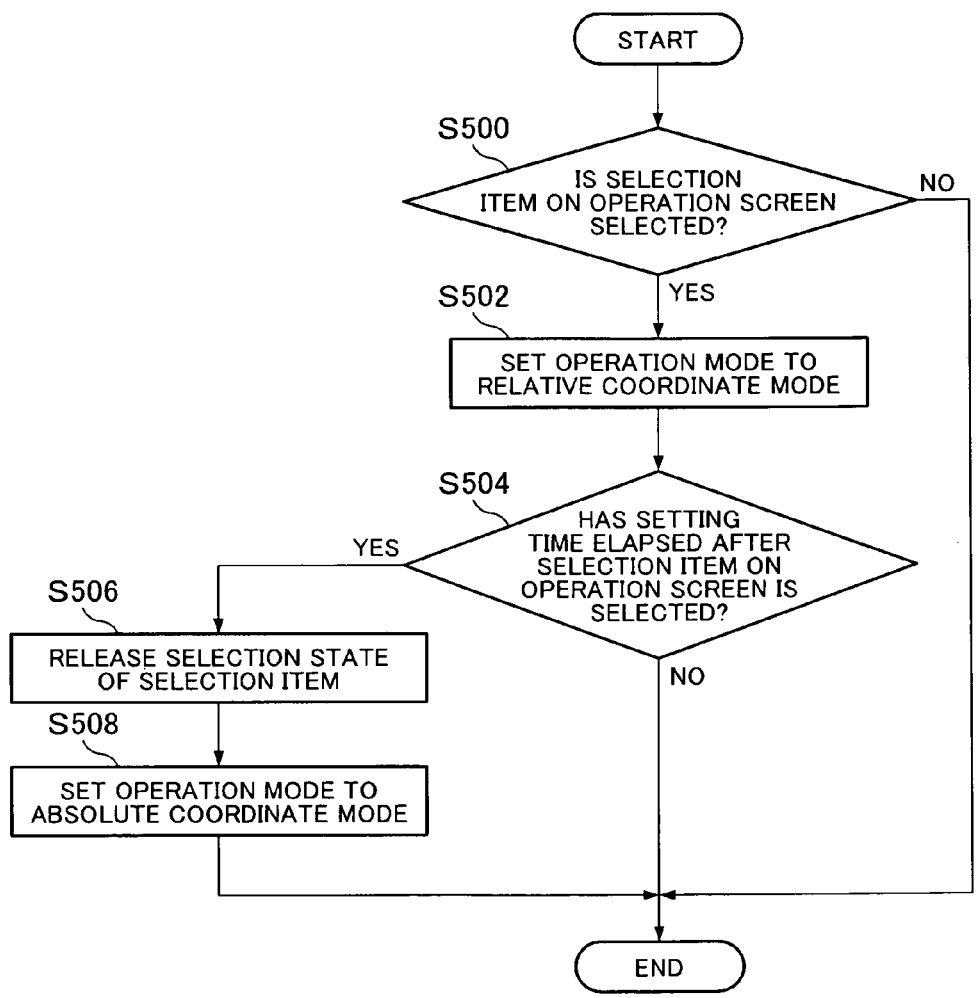
FIG. 5 is a flowchart showing one example of main processing executed by a display control unit 30.

FIG. 5 is a flowchart showing one example of main processing executed by the display control unit 30. When the ignition switch of the vehicle is on, this processing routine may be repeatedly executed at a predetermined periodic interval while the coordinate signal is not received (when the user has not yet performed the selection operation). When the coordinate signal is entered, the display control unit 30 moves the cursor 80 in response to the received coordinate signal while maintaining the operation mode that is set by this processing routine.

In step 500, the display control unit 30 determines whether one of the selection items on the operation screen of the display 20 is selected (that is, whether one of the items is in the selection state). In the initial state of the operation screen, one of the selection items may be selectively displayed as the default or all selection items may be non-selectively displayed, depending upon the attribute of the operation screen. If one of the selection items on the operation screen of the display 20 is selected, the processing proceeds to step 502. On the other hand, in other cases (if none of the selection items is selected), the display control unit 30 terminates the processing for this cycle without performing processing. In this case, the absolute coordinate mode, which will be described later, is maintained.

In step 502, the operation mode is set to (or maintained in) the relative coordinate mode. When the coordinate signal is received after this step, the display control unit 30 operates in the relative coordinate mode. The relative coordinate mode refers to a synchronization mode in which the coordinate system of the screen of the display 20 corresponds relatively to the coordinate system of the operation surface of the touch pad 10 in a relatively synchronous manner. In the relative coordinate mode, the coordinate system of the screen of the display 20 is made to correspond to the coordinate system of the operation surface of the touch pad 10 in such a manner that, typically, the origin of the coordinate system of the screen of the display 20 is positioned at the current position of the cursor 80 and the origin of the coordinate system of the operation surface of the touch pad 10 is positioned at the current finger touch position on the operation surface. More specifically, in the relative coordinate mode, the cursor 80 is moved according to the finger movement distance {(x2, y2)−(x1, y1)} on the operation surface, as conceptually shown in FIG. 6, regardless of the coordinate position itself of the finger touch position on the operation surface. In the example shown in FIG. 6, the finger touch position on the operation surface is moved to the right for a distance of {(x2, y2)−(x1, y1)} and, accordingly, the cursor 80 is moved to the right as shown by the arrow Y1. In this case, a selection item to be selectively displayed may be determined in such a manner that draw-in force is applied to a selection item near the position to which the cursor is moved. Unlike the example shown in FIG. 4, a total of eight selection items are arranged in two columns on the display 20 in the example shown in FIG. 6 (and also in the example in FIG. 7).

In step 504, the display control unit 30 determines whether a predetermined setting time has elapsed after a selection item is selected on the operation screen. The predetermined setting time, which corresponds to an upper limit time during which the user is assumed to continue a sequence of operations, may be fixed or varied. If the predetermined setting time has elapsed after a selection item is selected on the operation screen, the processing proceeds to step 506. On the other hand, in other cases, the display control unit 30 terminates the processing for this cycle without performing processing. In this case, the relative coordinate mode is maintained.

In step 506, the selection state of the selected item is released. When this step is executed, all selection items on the operation screen of the display 20 are placed in the non-selection state (that is, the cursor 80 disappears).

In step 508, the operation mode is set to the absolute coordinate mode. After this step, the display control unit 30 operates in the absolute coordinate mode. The absolute coordinate mode refers to a synchronization mode in which the coordinate system of the screen of the display 20 corresponds absolutely to the coordinate system of the operation surface of the touch pad 10 in an absolutely synchronous manner. In the absolute coordinate mode, the coordinate system of the screen of the display 20 is made to correspond to the coordinate system of the operation surface of the touch pad 10 in such a manner that, typically, the origin of the coordinate system of the screen of the display 20 is positioned at a fixed position and the origin of the coordinate system of the operation surface of the touch pad 10 is positioned at a fixed position. In the example shown in FIG. 7, the coordinate system of the screen of the display 20, in which the origin is permanently positioned in the lower left corner of the screen of the display 20, is made to correspond to the coordinate system of the operation surface of the touch pad 10 in which the origin is permanently positioned in the lower left corner of the operation surface of the touch pad 10. In the example shown in FIG. 7, the cursor 80 moves to the selection item positioned at the coordinate position (X1,Y1) of the screen of the display 20 corresponding to the finger touch position (x1, y1) on the operation surface. In this case, a selection item to be selectively displayed may be determined in such a manner that draw-in force is applied to a selection item near the coordinates of the coordinate signal.

According to the processing shown in FIG. 5, the absolute coordinate mode is formed as described above when a selection item is not selected. In this mode, the user can intuitively select a desired selection item. On the other hand, when a selection item is selected, the relative coordinate mode is formed. In this mode, the user can select the same selection item easily even if the user once lifts the finger from the operation surface of the touch pad 10. This mode is particularly useful for a driver who cannot keep a finger placed continuously on the operation surface of the touch pad 10 because he or she must operate the steering wheel while traveling in a vehicle. For example, when entering the same selection item continuously on a Japanese syllabary entry screen (for example, a selection item for entering the character "O" when entering "OOKII"), the driver can easily select the same selection item even if he or she once lifts the finger from the operation surface of the touch pad 10, thus increasing operability. As described above, a character is actually entered when the user selects a selection item and then depresses the coordinate detection unit 12 (operation surface on the touch pad 10 at that position) to perform the confirmation operation.

In the processing shown in FIG. 5, the processing in step 506 may be omitted. That is, the absolute coordinate mode may be formed while maintaining the selection state of a selection item.

Figure 8:
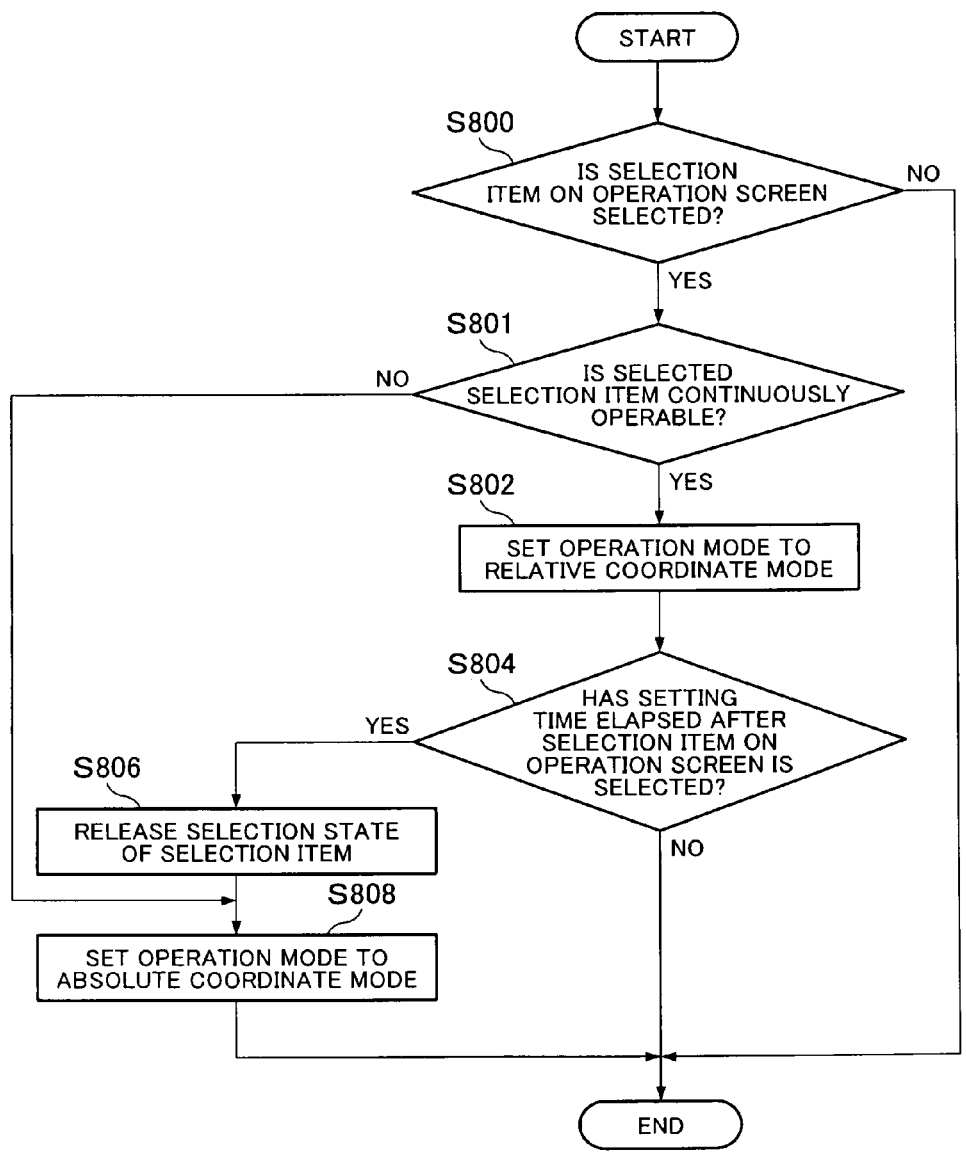
FIG. 8 is a flowchart showing another example of main processing executed by the display control unit 30.

FIG. 8 is a flowchart showing another example of main processing executed by the display control unit 30. For example, when the ignition switch of a vehicle is on, this processing routine may be executed repeatedly at a predetermined periodic interval while the coordinate signal is not received. While the coordinate signal is received, the display control unit 30 moves the cursor 80 in response to the received coordinate signal while maintaining the operation mode that is set by this processing routine.

The processing in steps 800, 802, 804, 806, and 808 shown in FIG. 8 is the same as the processing in steps 500, 502, 504, 506, and 508 shown in FIG. 5 respectively and therefore the description is omitted.

In step 800, if any of the selection items on the operation screen of the display 20 is selected, the processing proceeds to step 801.

In step 801, the display control unit 30 determines whether the selected selection item is a continuously operable selection item. A continuously operable selection item is typically a selection item displayed as an adjustment button for adjusting the volume or the temperature and a selection item displayed as the character entry button and the character erase button. A non-continuously operable selection item is a selection item that does not generate a virtual change even if continuously operated. For example, in the example shown in FIG. 4, the selection item "LO" is a non-continuously operable selection button. If the selected selection item is a continuously operable selection item, the processing proceeds to step 802. In this case, the relative coordinate mode is formed as described above. On the other hand, if the selected selection item is a non-continuously operable selection item, the processing proceeds to step 808. In this case, the absolute coordinate mode is formed (or maintained) as described above. In this case, the mode may be changed to the absolute coordinate mode when the coordinate signal is not received (that is, when the user lifts the finger from the touch pad) in the state in which a non-continuously operable selection item is selected.

According to the processing shown in FIG. 8, the absolute coordinate mode is formed if a selection item is not selected or a non-continuously operable selection item is selected. Therefore, the user can intuitively select other desired selection items. If a continuously operable selection item is selected, the relative coordinate mode is formed. Therefore, the user can continuously perform operation (selection operation and confirmation operation) easily on the same continuously operable selection item even if the user once lifts the finger from the operation surface of the touch pad 10.

In the processing shown in FIG. 8, if the selected selection item is a non-continuously operable selection item, the processing may proceed to step 808 via step 806. That is, it is possible to release the selection state of the selection item and then form the absolute coordinate mode.

Figure 9:
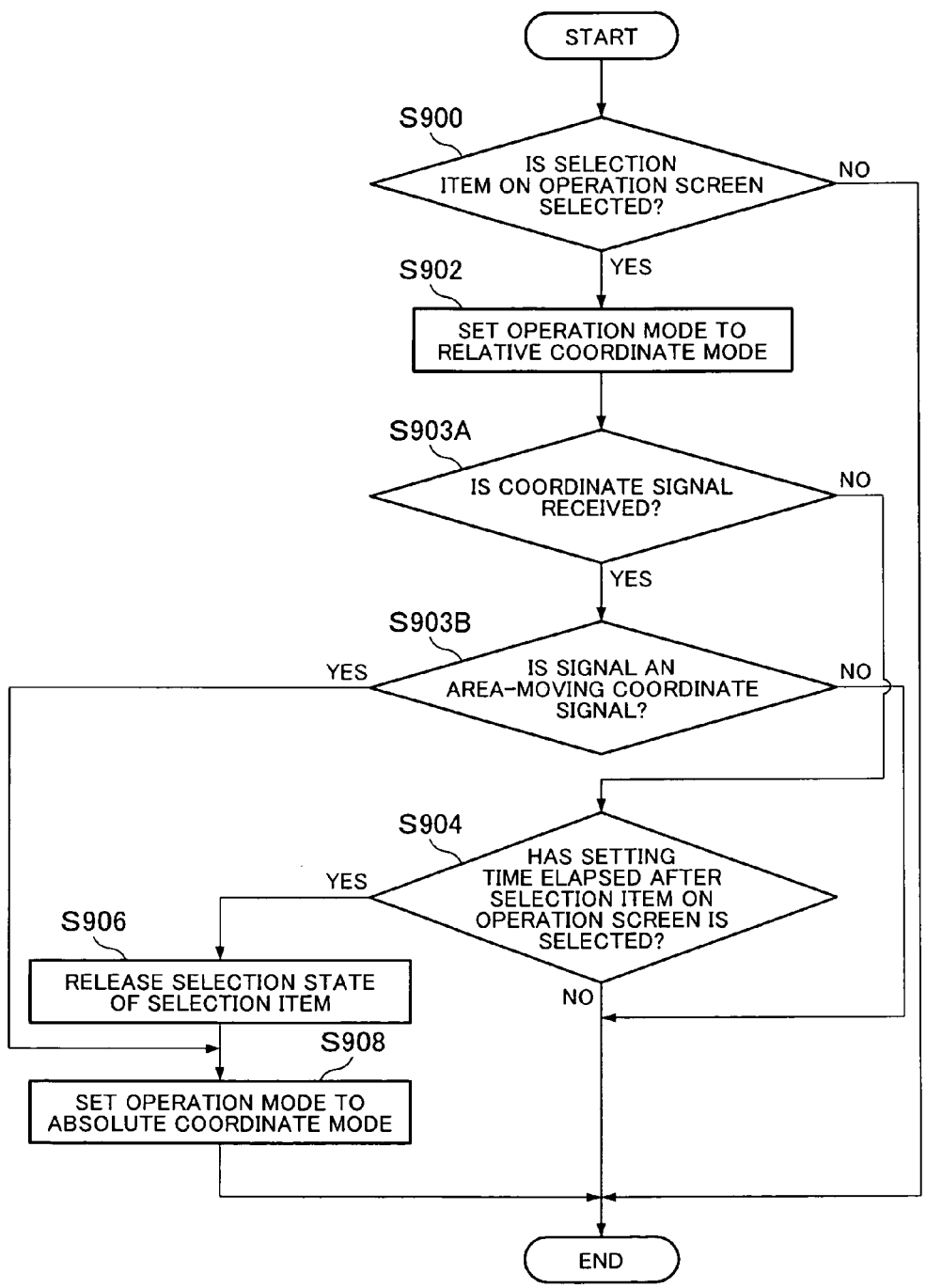
FIG. 9 is a flowchart showing still another example of main processing executed by the display control unit 30.

FIG. 9 is a flowchart showing still another example of main processing executed by the display control unit 30. For example, when the ignition switch of a vehicle is on, this processing routine may be executed repeatedly at a predetermined periodic interval.

The processing in steps 900, 902, 904, 906, and 908 shown in FIG. 9 is the same as the processing in steps 500, 502, 504, 506, and 508 shown in FIG. 5 respectively and therefore the description is omitted.

In step 903A, the display control unit 30 determines whether the coordinate signal is entered (sent) from the control unit 16. That is, the display control unit 30 determines whether the user starts (resumes) the selection operation. If the coordinate signal is received, the processing proceeds to step 903B. If the coordinate signal is not received, the processing proceeds to step 904.

In step 903B, the display control unit 30 determines whether the area-moving coordinate signal is received. Areas are a plurality of areas created by virtually dividing the operation surface of the touch operation unit. Therefore, area moving means that the coordinate signal changes when moving from one area to another. That is, area moving means that the area, which includes the coordinate position represented by the currently-received coordinate signal, differs from the area which includes the coordinate position represented by the last-received (immediately preceding) coordinate signal. The last-received coordinate signal corresponds to the immediately preceding coordinate signal after which no coordinate signal is received. That is, the last-received coordinate signal corresponds to the coordinate signal generated immediately before the user lifts the finger when the user once lifts the finger and then starts the selection operation again. There is a variety of methods for setting areas, and some of the methods will be described later with reference to FIG. 10 and FIG. 11. Areas may vary according to the operation screen. Areas are set for each operation screen in advance, and the specified area information may be stored in a predetermined memory. In this case, the display control unit 30 may read area information according to the operation screen to perform the determination processing in step 903B.

If the area-moving coordinate signal is received in step 903B, the processing proceeds to step 908. On the other hand, if the area-moving coordinate signal is not received (that is, the coordinate signal in the same area as that of the last received coordinate signal is received), the display control unit 30 terminates the processing. In this case, the relative coordinate mode is maintained and the currently received coordinate signal is processed in the relative coordinate mode. During the reception of continuous coordinate signals beginning at the reception of the current coordinate signal (for example, during the finger-sliding operation and the confirmation operation that follows), the relative coordinate mode is maintained. When the reception of the coordinate signal is stopped (when the user lifts the finger from the operation surface of the touch pad 10), the display control unit 30 resumes the processing beginning in step 900.

If the area-moving coordinate signal is received, the processing proceeds to step 908 to set the mode to the absolute coordinate mode. Therefore, the currently received coordinate signal (area-moving coordinate signal) is processed in the absolute coordinate mode. When the reception of continuous coordinate signals beginning at the reception of the current coordinate signal is stopped (when the user lifts the finger from the operation surface of the touch pad 10), the display control unit 30 resumes processing beginning in step 900.

FIG. 10 is a diagram showing an example of the setting method of areas related to step 903B in FIG. 9 and schematically showing the operation surface of the touch pad 10. FIG. 11 is a diagram schematically showing the display 20 and the touch pad 10 and showing a drawback of the relative coordinate mode that may be generated when the user wants to select the selection item "Return".

In the example shown in FIG. 10, the operation surface of the touch pad 10 is divided into four areas 101, 102, 103, and 104. The area 102 is an upper right area corresponding to the position of the "Return" selection item.

Assume that the user wants to operate the "Return" selection item as shown in FIG. 11. Here, assume that the selection item in the lower left corner is now in the selection state as shown in FIG. 11. That is, the area that includes the coordinate position, represented by the last received (immediately preceding) coordinate signal, is the area 103. In this state, assume that the user wants to select the "Return" selection item in the upper right corner. In this case, if the relative coordinate mode is formed, the user must slide the finger for a relatively long distance from the lower left corner to the upper right corner of the operation surface of the touch pad 10 as schematically indicated by the movement of a hand indicated by the arrow Y2 in FIG. 11. This operation decreases operability. In particular, for a selection item such as the "Return" selection item that is arranged in the common position on many operation screens, the user wants to once lift the finger and directly select the selection item. The problem with the relative coordinate mode is that the user cannot perform the operation in that manner.

In contrast, according to the processing shown in FIG. 9, when the user touches a position in the upper right corner on the operation surface of the touch pad 10 directly with his or her finger, the received coordinate signal is an area-moving coordinate signal that is processed in the absolute coordinate mode. That is, the coordinate signal, generated when the user touches a position in the upper right corner directly with his or her finger, belongs to the area 102 shown in FIG. 10 that is different from the area 103 to which the immediately preceding coordinate signal belongs. Therefore, the generated coordinate signal is processed in the absolute coordinate mode. This means that, according to the processing shown in FIG. 9, when the user wants to perform operation on a selection item such as the "Return" selection item shown in FIG. 11 that is apart from a selection item selected immediately before, the user can lift the finger and directly select the selection item, thus increasing operability.

Although divided into four areas of the same size in the example shown in FIG. 10, the operation surface of the touch pad 10 may be divided into any number of areas or into areas of any shape (including relatively large and small areas). Each area preferably includes coordinates (range) corresponding to at least one selection item in the absolute coordinate system. In addition, one of the plurality of areas preferably includes coordinates (range) corresponding to a selection item, such as the "Return" selection item, which is arranged in the common position on a plurality of operation screens.

Figure 12:
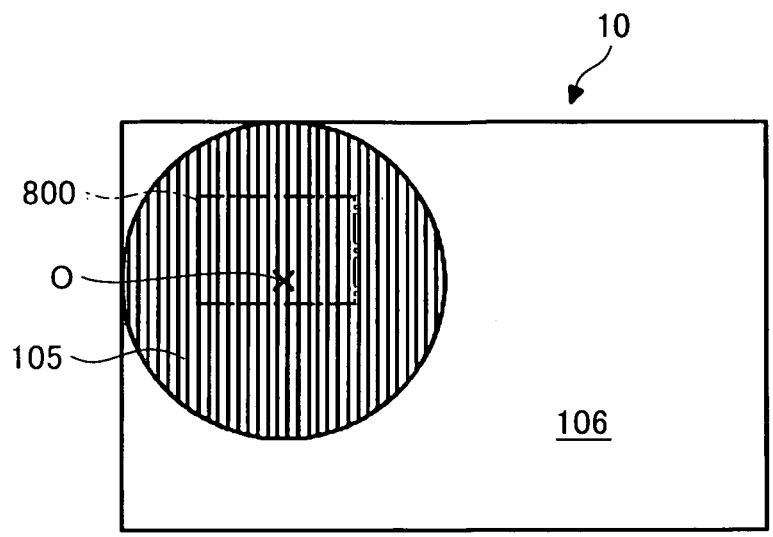
FIG. 12 is a diagram showing another example of the setting method of areas related to step 903B in FIG. 9.

FIG. 12 is a diagram showing another example of the setting method of areas related to step 903B in FIG. 9 and schematically showing the operation screen of the touch pad 10.

In the example shown in FIG. 12, the operation surface of the touch pad 10 is divided into two areas: an area 105 with the immediately preceding coordinate signal O as its center and the other area 106. As shown in FIG. 12, the area 105 may be a circle centered on the immediately preceding coordinate signal O with the radius of a predetermined size. The area 105 may also be set in a manner in such a way that it includes a coordinate range 800 that corresponds to a currently selected selection item in the absolute coordinate system.

An area-moving coordinate signal is received also by the area setting method shown in FIG. 12 when the finger-touch point on the operation surface of the touch pad 10 is positioned outside the area 105 (that is, the position is apart from the coordinate position, represented by the immediately preceding coordinate signal, by a predetermined distance or longer). In this case, the received area-moving coordinate signal is processed by the processing shown in FIG. 9 in the absolute coordinate mode. This allows the user to lift the finger and directly select a selection item when the user wants to perform operation on a selection item, such as the "Return" selection item shown in FIG. 11, that is apart from a selection item selected immediately before, thus increasing operability.

In the area setting method shown in FIG. 12, the area 105 is set as an area (a circle in this example) within a predetermined range centered on the immediately preceding coordinate signal. Instead of this, the area 105 may be set as an area within a predetermined range with a currently selected selection item as the reference. In addition, the area 105 need not always be a circle but may have other shapes such as a rectangular shape.

When the user performs the finger-sliding operation (that is, the coordinate signal is received continuously) in the area setting method shown in FIG. 12, the area 105 is updated as the coordinate signal is updated, meaning that the coordinate signal within the other area 106 is never received. Therefore, when the user performs the finger-sliding operation, the relative coordinate mode is always maintained. On the other hand, when the user performs the finger-sliding operation in the area setting method shown in FIG. 10, the area-moving coordinate signal may be received. For example, when the user slides his or her finger from a position within the area 103 to a position within the area 102, the area-moving coordinate signal is received. In this case, the mode may be changed from the relative coordinate mode to the absolute coordinate mode during the finger-sliding operation. By changing the mode in this manner, the user can select a desired selection item even during the finger-sliding operation, in which a desired selection item cannot be reached in the relative coordinate mode, because the mode is changed to the absolute coordinate mode.

Figure 13:
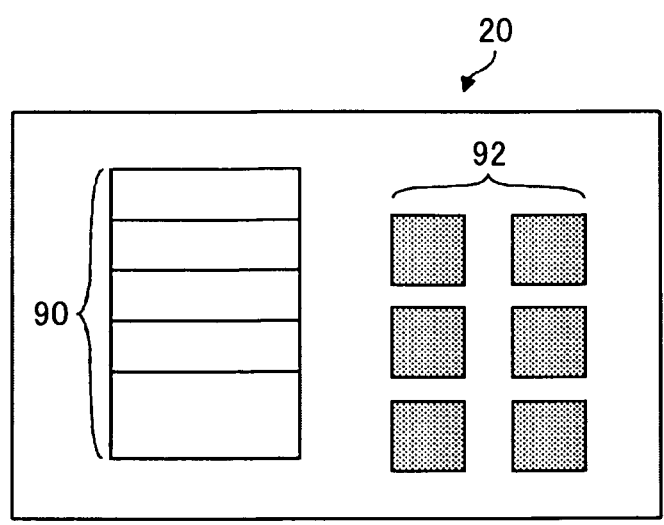
FIG. 13 is a general diagram of the display 20 showing still another example of the setting method of areas related to step 903B in FIG. 9.

FIG. 13 is a diagram showing still another example of the area setting method related to step 903B in FIG. 9 and schematically showing the operation screen of the display 20. FIG. 14 is a diagram schematically showing the touch pad 10 that shows the area setting method related to FIG. 13.

The operation screen of the display 20 shown in FIG. 13 includes a first selection item set 90 and a second selection item set 92. The first selection item set 90 and the second selection item set 92 are different in the attribute (category). For example, the first selection item set 90 and the second selection item set 92 may be different in the operation target application (for example, the audio operation and the air conditioner operation). Instead of the attribute, the first selection item set 90 and the second selection item set 92 may be different in the hierarchy. For example, the first selection item set 90 may include list-selection selection items such as those for the audio operation or those for the air conditioner operation, and the second selection item set 92 may include lower-level selection items of a selected list. In this case, the contents of the selection items of the second selection item set 92 may change according to a selection item selected from the first selection item set 90.

When the operation screen of the display 20 is the one shown in FIG. 13, the operation surface of the touch pad 10 is divided into two areas, an area 107 corresponding to the first selection item set 90 and an area 108 corresponding to second selection item set 92, as shown in FIG. 14.

According to the area setting method shown in FIG. 13 and FIG. 14, the user once lifts his or her finger from the operation surface after selecting a list and touches the area 108 with the finger in attempt to select a desired selection item from the second selection item set 92. In this case, the coordinate signal moves from the area 107 to the area 108 according to the processing shown in FIG. 9 (on the display 20, the coordinate signal moves from the display area of the first selection item set 90 to the display area of the second selection item set 92), and the mode changes from the relative coordinate mode to the absolute coordinate mode. This allows the user to directly select a desired selection item from the second selection item set 92, thus increasing operability.

Also in the area setting method shown in FIG. 13 and FIG. 14, the area-moving coordinate signal may be received as in the area setting method shown in FIG. 10 when the user performs the finger-sliding operation. For example, when the user performs the finger-sliding operation from the area 107 to the area 108, the area-moving coordinate signal is received. In this case, the mode may be changed from the relative coordinate mode to the absolute coordinate mode during the finger-sliding operation. By changing the mode in this manner, the user can select a desired selection item even during the finger-sliding operation, in which a desired selection item in the second selection item set 92 cannot be reached in the relative coordinate mode, because the mode is changed to the absolute coordinate mode.

Although each of the first selection item set 90 and the second selection item set 92 in the example shown in FIG. 13 includes two or more selection items, a selection item set may include only one selection item. Although the selection items on the operation screen of the display 20 are classified into two categories in the example shown in FIG. 13, there is a variety of classification methods. For example, when the "Return" selection item is included, the "Return" selection item may be processed as one category. In other words, the area corresponding to the "Return" selection item may be set on the operation surface of the touch pad 10. When the operation screen of the display 20 is a map screen and there are various selection items on the map screen (for example, zoom-in button, zoom-out button, current location button, and so on), the area where various selection items are arranged on the map screen and the other area (map area) may be processed as different categories. That is, the area corresponding to the selection items and the area corresponding to the other area (map area) may be set on the operation surface of the touch pad 10.

In the example shown in FIG. 13, the mode is switched from the relative coordinate mode to the absolute coordinate mode based on the movement between the area 107 and the area 108 on the operation surface of the touch pad 10. Instead of this, the mode may be switched from the relative coordinate mode to the absolute coordinate mode based on the movement mode of the cursor 80 on the operation screen of the display 20. For example, when the position of the cursor 80 changes from the display area of the first selection item set 90 to the display area of the second selection item set 92 across the display areas (that is, when one of the selection items of the second selection item set 92 is selected), the mode may be switched from the relative coordinate mode to the absolute coordinate mode.

In the embodiments described above, the "control device" in the claims is implemented by the control unit 16 and the display control unit 30 that work together. As described above, the function may be divided between the control unit 16 and the display control unit 30 in any way, and the function of one of the control units may be performed, in part or in whole, by the other control unit. When all the function of one of the control units is performed by the other control unit, there is of course no need for communication between them. The function of the control unit 16 and the display control unit 30 may be implemented by three or more control units that work together.

Although the preferred embodiments of the present invention have been described in detail above, it is to be understood that the present invention is not limited to the embodiments described above but various modifications and replacements may be added to the embodiments described above without departing the scope of the present invention.

For example, the processing routine shown in FIG. 5 may be executed in the non-operation state (the state in which the user has lifted the finger from the operation surface of the touch pad 10) after the confirmation operation is performed. The reason is as follows. If the user has failed in an operation and selected an unintended selection item in the absolute coordinate mode before the confirmation operation, the user sometimes wants to select a desired selection item again after lifting the finger. In this case, when the unintended selection item, once selected, is placed in the selection state and the mode is changed to the relative coordinate mode, the same unintended selection item is selected again even if the user lifts the finger and then touches another position on the operation surface of the touch pad 10 in attempt to select the desired selection item. On the other hand, after the confirmation operation, there is a high possibility that the user has selected an intended selection item (in general, the user does not perform the confirmation operation if the selection item is an unintended selection item). Therefore, when the user continues the operation, convenience is increased if the mode is the relative coordinate mode. This applies also to the other processing routines such as the one shown in FIG. 8.

In the embodiments described above, the cursor 80 is configured to indicate the relation between a user finger touch position on the operation surface of the touch pad 10 and a position on the operation screen of the display 20. Instead of the cursor 80, a pointer such as the one used on a standard PC (Personal Computer) may also be used. When a pointer is used, the cursor 80 (selective display) may also be maintained.

The confirmation operation is performed by depressing the operation surface of the touch pad 10 in the embodiment described above. Instead of this, the confirmation operation may be performed by a depression switch, provided separately from the touch pad 10, such as a standard electrostatic capacitance type touch pad used on a notebook PC.

The vibration generation unit 15, though provided in the embodiments described above to give the operator a pseudo click feeling, may be omitted.

Although only the finger operation amount (movement amount) and the operation direction, but not the finger operation speed, are considered in the relative coordinate mode in the embodiments described above, the finger operation speed may also be considered. For example, it is possible to increase the movement amount of the cursor 80 as the operation speed becomes higher. This allows the user to increase the operation speed to avoid the need for a relatively long-distance finger-sliding operation or a repeated finger-sliding operation even when the relative coordinate mode is maintained.

In the embodiments described above, the on-vehicle operation device 1 is described as a particularly preferred embodiment. The similar operation device may be used also on a non-vehicle application.

On the operation screen on which the higher hierarchy (first selection item set 90 for list selection in the example shown in FIG. 13) and the lower hierarchy (second selection item set 92) are displayed on the same operation screen at the same time such as the operation screen shown in FIG. 13, a total of two selection items are formally placed in the selection state at the same time when a selection item is selected in each hierarchy. However, in this state, only a selection item in the lower hierarchy is substantially selected. This is because the selection item in the higher hierarchy does not function as a button once a selection item in the lower hierarchy is selected (that is, the confirmation operation is the confirmation operation for a selection item in the lower hierarchy).

REFERENCE SIGNS LIST

1 On-vehicle operation device
10 Touch pad
12 Coordinate detection unit
14 Depression pressure detection unit
15 Vibration generation unit
16 Control unit
18 Memory
20 Display
30 Display control unit
40 Mechanical switch
41 Selection switch
42 Confirmation switch
80 Cursor
90 First selection item set
92 Second selection item set
101-108 Area

The invention claimed is:
1. An operation device comprising:
a touch operation unit that has an operation surface; and
a control device that responds to a selection operation based on two-dimensional coordinates of a finger touch point on the operation surface, the selection operation being performed on each of selection items displayed on a display device arranged remotely from the touch operation unit, wherein
the control device moves a display position of a cursor in an absolute coordinate mode when any of the selection items is not selected, the absolute coordinate mode being a mode in which a coordinate system of the operation surface of the touch operation unit corresponds absolutely to a coordinate system of the display device, the control device moves the display position of the cursor in a relative coordinate mode when one of the selection items is selected, the relative coordinate mode being a mode in which the coordinate system of the operation surface of the touch operation unit corresponds relatively to the coordinate system of the display device, and the selection of the one of the selection items is performed by moving the display position of the cursor to a position of the one of the selection items.

2. The operation device according to claim 1 wherein when a selection state, in which any of the selection items is selected, continues for a predetermined time, the control device releases the selection state.

3. The operation device according to claim 1 wherein when a plurality of assumed areas, created by dividing the operation surface of the touch operation unit into a plurality of pieces, is assumed and the two-dimensional coordinates of the finger touch point on the operation surface change from one to another of the assumed areas, the control device switches the mode from the relative coordinate mode to the absolute coordinate mode and operates in the absolute coordinate mode even if the one of the selection items is selected.

4. The operation device according to claim 3 wherein the selection items displayed on the display device are divided into, and arranged in, at least two display areas according to attributes of the selection items and the assumed areas are respectively set for the at least two display areas.

5. The operation device according to claim 1 wherein when the two-dimensional coordinates of the finger touch point on the operation surface are away from immediately preceding two-dimensional coordinates of the finger touch point on the operation surface by a predetermined distance or longer, the control device switches the mode from the relative coordinate mode to the absolute coordinate mode for operation even if the one of the selection items is selected.

6. The operation device according to claim 1 wherein the selection items displayed on the display device are divided into, and arranged in, at least two display areas according to attributes of the selection items and when the two-dimensional coordinates of the finger touch point on the operation surface change from one to another of the display areas while the two-dimensional coordinates correspond to the coordinate system of the display device in the relative coordinate mode, the control device switches the mode from the relative coordinate mode to the absolute coordinate mode and operates in the absolute coordinate mode even if the one of the selection items is selected.

7. The operation device according to claim 1 wherein the control device operates in the relative coordinate mode when the selected one of the selection items is a continuously operable selection item and the control device operates in the absolute coordinate mode when the selected one of the selection items is a non-continuously operable selection item.

8. The operation device according to claim 1, further comprising:

depression pressure detection means provided in the touch operation unit for detecting a pressure or a load applied to the touch operation unit wherein the control unit responds to a confirmation operation on the selected one of the selection items when an output of the depression pressure detection means exceeds a predetermined threshold.

9. The operation device according to claim 1 wherein the one of the selection items, when the one of the selection items is selected, is changed to a selection display showing an operator that the one of the selection items is selected.

10. The operation device according to claim 1, further comprising:

a depression pressure detection unit that is provided in the touch operation unit and configured to detect a pressure or a load applied to the touch operation unit wherein the control unit responds to a confirmation operation on the selected one of the selection items when an output of the depression pressure detection unit exceeds a predetermined threshold.

* * * * *